United States Patent [19]

Okada et al.

[11] Patent Number: 5,627,448
[45] Date of Patent: May 6, 1997

[54] ELECTRIC VEHICLE CHARGING CONNECTOR ASSEMBLY

[75] Inventors: Hajime Okada; Sinichi Yamada; Eiji Saijo, all of Yokkaichi, Japan

[73] Assignee: Sumitomo Wiring Systems, Ltd., Yokkaichi, Japan

[21] Appl. No.: 230,251

[22] Filed: Apr. 20, 1994

[30] Foreign Application Priority Data

Apr. 22, 1993 [JP] Japan .................................. 5-120498
Apr. 27, 1993 [JP] Japan .................................. 5-125118

[51] Int. Cl.$^6$ ........................... H01M 10/46; H01R 13/44
[52] U.S. Cl. ........................... 320/2; 439/133; 439/314
[58] Field of Search ........................... 320/2, 15; 439/133, 439/310, 311, 312, 314

[56] References Cited

U.S. PATENT DOCUMENTS

| | | | |
|---|---|---|---|
| 4,066,315 | 1/1978 | Arneson | 439/311 |
| 4,080,029 | 3/1978 | St. Fort. | |
| 4,183,605 | 1/1980 | Arneson | 439/311 |
| 4,305,180 | 12/1981 | Schwartz | 439/314 X |
| 4,553,000 | 11/1985 | Appleton. | |
| 4,895,530 | 1/1990 | Gugelmeyer et al. | 439/311 |
| 5,190,466 | 3/1993 | McVey | 439/133 X |
| 5,252,078 | 10/1993 | Langenbahn | 320/2 X |

FOREIGN PATENT DOCUMENTS

| | | | |
|---|---|---|---|
| 4213159 | 10/1993 | Germany | 320/2 |
| 4-124774 | 11/1992 | Japan . | |
| 4-334908 | 11/1992 | Japan . | |

*Primary Examiner*—Peter S. Wong
*Assistant Examiner*—Edward Tso
*Attorney, Agent, or Firm*—Wenderoth, Lind & Ponack

[57] ABSTRACT

An electrical connector assembly used for charging an electric vehicle includes a power source side connector and a vehicle side connector. The power source side connector is detachably connected to the vehicle side connector mounted on the body of an electric vehicle. A locking device disposed in the power source side connector is turned to a locking state with an ignition key of the electric vehicle so that the connectors are locked in the mating engagement. Since the power source side connector cannot be disconnected from the vehicle side connector, charging can be prevented from being inadvertently interrupted. The charging can be initiated only when the connectors are locked in the mating engagement. Alternatively, the locking device can be used to lock a switch of a charging circuit in a closed position which allows charging to take place.

9 Claims, 10 Drawing Sheets

ELECTRIC VEHICLE CHARGING CONNECTOR ASSEMBLY

BACKGROUND OF THE INVENTION

1. Field of the Invention

This invention relates to an electric vehicle charging connector assembly used for charging a power battery of an electric vehicle.

2. Description of the Prior Art

Social problems associated with environmental and energy issues have recently given rise to the demand for an electric vehicle loaded with a power battery. Some types of electric vehicles have been put to practical use. The power battery provided in a body of the electric vehicle needs to be frequently charged and accordingly, an external battery charger needs to be readily connected to the power battery of the electric vehicle. Use of a connector assembly has been proposed for the purpose of connecting the battery charger and the power battery of the electric vehicle.

The connector assembly used for the above-described purpose includes a vehicle side connector housing mounted on the body of the electric vehicle and vehicle side terminals enclosed in the vehicle side connector housing. The vehicle side terminals are connected to the power battery of the electric vehicle. The connector assembly further includes a power source side connector having a power source side connector housing and power source side terminals enclosed in the power source side connector housing. The power source side connector housing is mated with and unmated from the vehicle side connector housing so that the power source side terminals are connected to and disconnected from the vehicle side terminals, respectively. Furthermore, various types of mechanical engaging structures or mechanisms are provided for holding both connector housings in the mated stated.

Charging the electric vehicle requires more time than fueling a gasoline-powered automobile. Accordingly, an operator cannot always watch the charging. In particular, when a power battery of the electric vehicle is charged at a house of an owner and not at a charging station, a quick charging using a large current cannot be performed. Accordingly, charging is performed overnight for the electric vehicle parked at a garage or the like. In such a case, the power source side connector and the vehicle side connector are mated together so that charging is initiated, and the connector assembly is left in the mated state for a long period of time without the operator in attendance.

In the conventional connectors of the above-described type, however, the engaging mechanism holding the connectors in the mated state is not provided with any safety mechanism. Accordingly, charging is interrupted when an intruder disengages the engaging mechanism of the power source side connector such that it is unmated from the vehicle side connector, for example. Furthermore, the intruder may operate a battery charger without leave to charge the power battery of his or her own electric vehicle.

SUMMARY OF THE INVENTION

Therefore, an object of the present invention is to provide an electric vehicle charging connector assembly wherein the power source side and vehicle side connectors can be reliably prevented from being unmated inadvertently when the connector assembly is left in the mated state.

Another object of the invention is to provide an electric vehicle charging connector assembly which can be prevented from being used without permission.

The present invention provides an electric vehicle charging connector assembly for externally charging a power battery provided in a body of an electric vehicle, thereby powering the electric vehicle. The connector assembly comprises a vehicle side connector housing provided on the body of the electric vehicle, vehicle side terminals enclosed in the vehicle side connector housing, a power source side connector housing to be mated with and unmated from the vehicle side connector housing, power source side terminals enclosed in the power source side connector housing to be electrically connected to the respective vehicle side terminals when the power source side connector housing is mated with the vehicle side connector housing, and a charging power circuit provided between the power source side terminals and the external power source. Cooperating parts of an engagement mechanism are provided on the power source side connector housing, respectively, and the vehicle side connector housing for holding the power source and vehicle side connector housings in a mating engagement when assuming a first state. The engagement mechanism allows both connector housings to be released from the mating engagement when assuming a second state. A preventing mechanism is provided for preventing the engagement mechanism from being turned from the first state to the second state. A locking device is provided in the power source side connector housing for activating the preventing mechanism when assuming a locking state, so that the engagement mechanism is not allowed to be turned from the first state to the second state. The locking device deactivates the preventing mechanism when assuming an unlocking state, so that the engagement mechanism is allowed to be turned from the first state to the second state. In this construction, the power source side connector is not allowed to be disengaged from the vehicle side connector as long as the locking device is in the locking state.

A protecting switch operated by the locking device may be provided for allowing and preventing the charging of the electric vehicle. The locking device is held in the locking state while the connector assembly is not used, so that charging is prevented. On the other hand, the locking device is held in the unlocking state while the connector assembly is in use, so that the power battery of the electric vehicle is charged.

BRIEF DESCRIPTION OF THE DRAWINGS

Other objects, features and advantages of the present invention will become clear upon reviewing the following description of a preferred embodiment thereof, made with reference to the accompanying drawings, in which.

DESCRIPTION OF THE PREFERRED EMBODIMENTS

Figure 2:
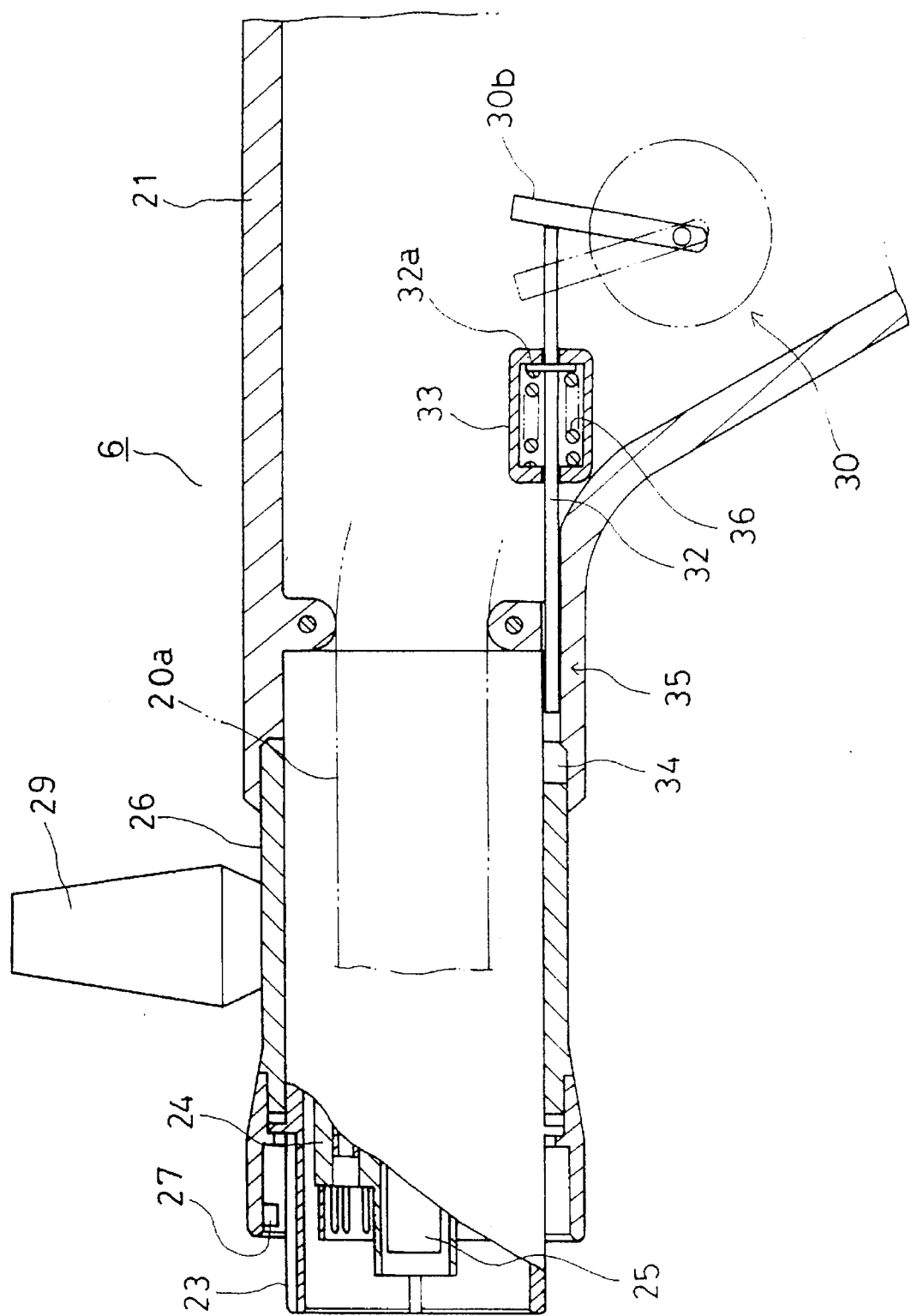
FIG. 2 is a partially enlarged sectional view of the power source side connector.
Figure 3:
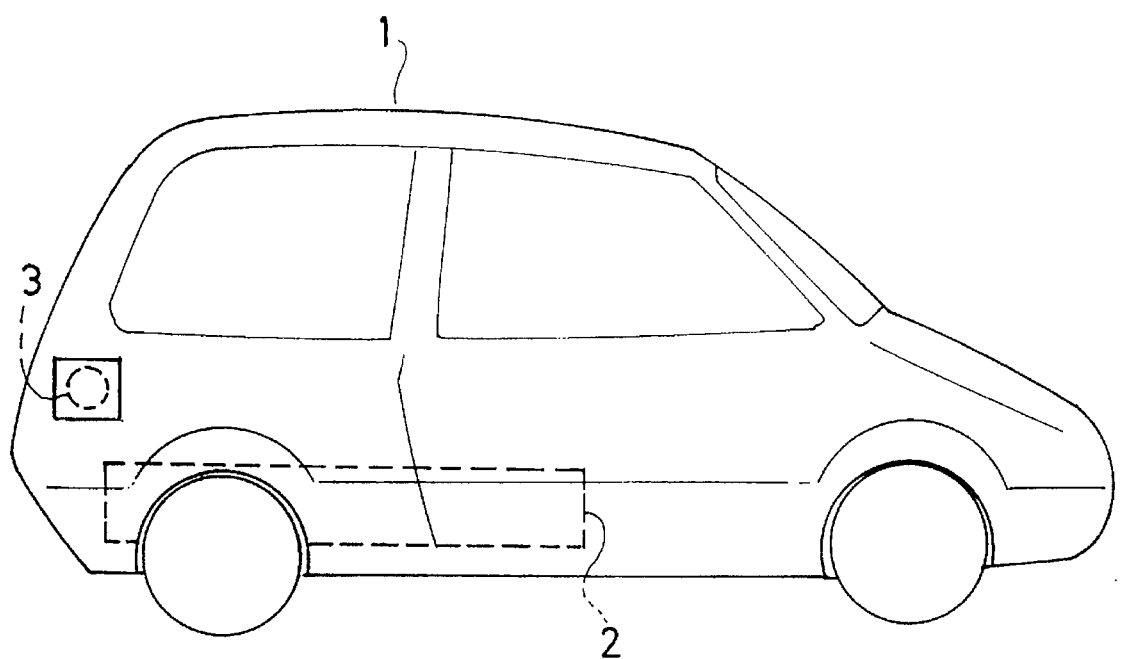
FIG. 3 is a schematic diagram of an electric vehicle.
Figure 3:
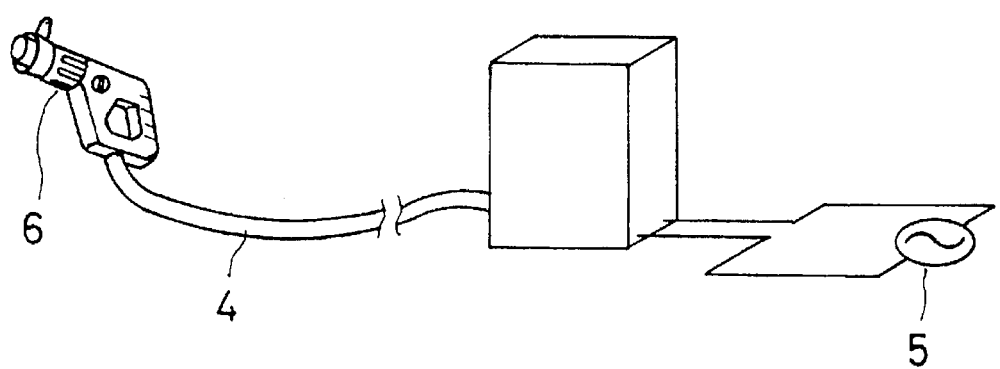

A first embodiment of the present invention will be described with reference to FIGS. 1 to 3 of the accompanying drawings. FIG. 3 schematically illustrates an electric vehicle. A power battery 2 is mounted in a body 1 of the electric vehicle. A connector assembly comprises a vehicle side connector 3 mounted on one side of the body 1. The vehicle side connector 3 is electrically connected to a power battery circuit (not shown) provided in the electric vehicle body 1. A power source side connector 6 connected to an external power source 5 via a charging cable 4 is to be mated with and unmated from the vehicle side connector 3. When both connectors 3, 6 are mated together, the power battery 2 of the electric vehicle is charged from the external power source 5.

Figure 1:
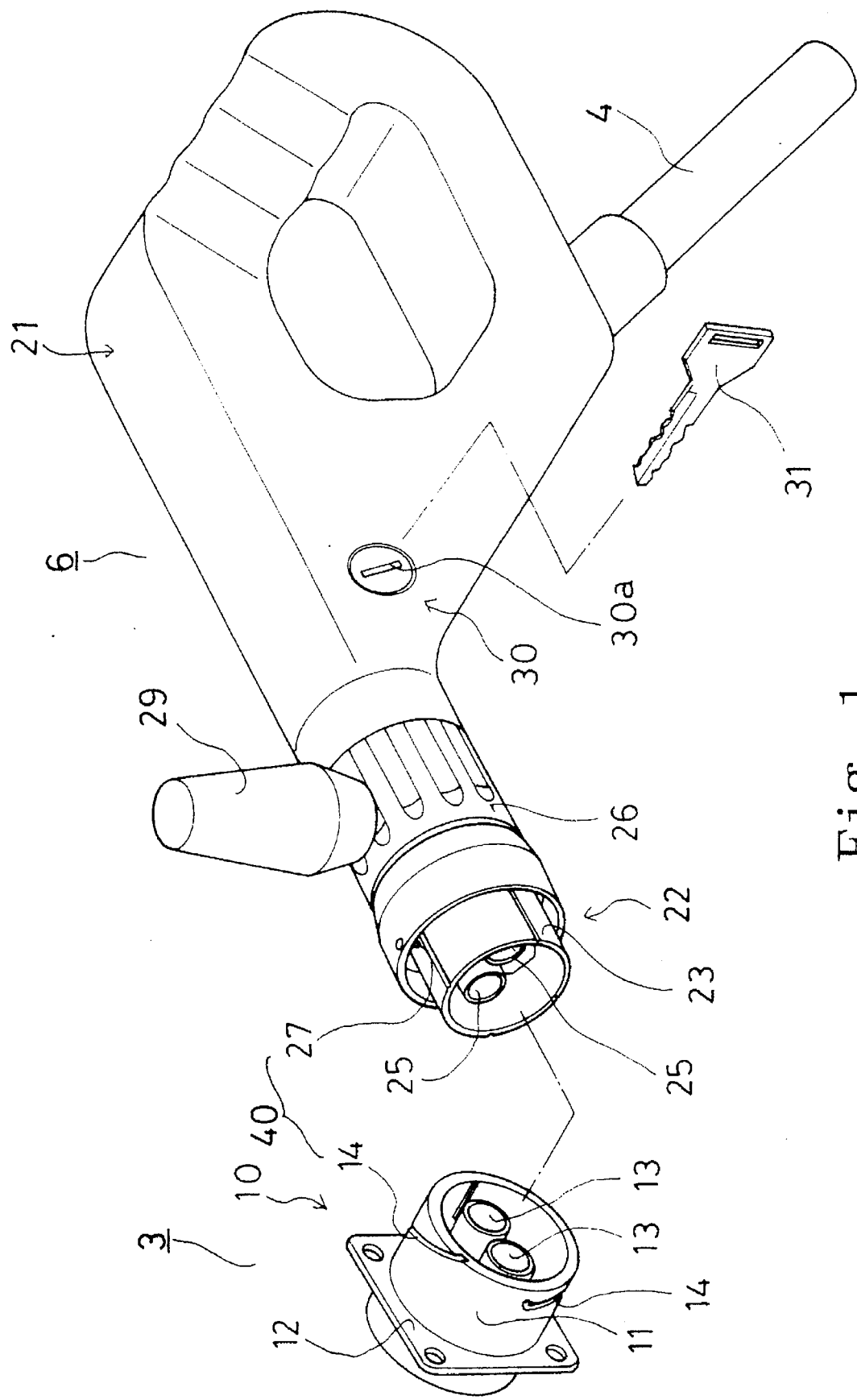
FIG. 1 is a perspective view of a vehicle side connector and a power source side connector of a first embodiment of an electric connector assembly in accordance with the present invention.

FIG. 1 illustrates the vehicle side connector 3 on its left-hand side and the power source side connector 6 on its right-hand side. The vehicle side connector 3 comprises a vehicle side connector housing 10 having an enclosure in the form of a cylindrical guide 11 and a rectangular flange 12 integrally formed with the guide 11. A pair of cylindrical vehicle side terminals 13 are enclosed in the guide 11. The guide 11 has an open front end and two spiral grooves 14 formed in an outer periphery thereof.

The power source side connector 6 comprises a generally rectangular frame-shaped grip 21 and a power source side connector housing 22 formed on the distal end of the grip 21 so that the connector 6 is formed into the shape of a gun. The charging cable 4 extends out of the bottom of the grip 21. The power source side connector housing 22 includes a cylindrical inner case 23 as shown in FIG. 2. An insulator 24 is disposed in the vicinity of a front open end of the inner case 23. A pair of power source side terminals 25 extend forward from the insulator 24 in the housing 22. The inner case 23 is inserted into the guide 11 of the vehicle side connector 3 so that the terminals 25 are fitted into the vehicle side terminals 13 to be electrically connected to them, respectively.

The power source side connector housing 22 further includes a cylindrical sleeve 26 mounted on the outer periphery of the inner case 23. The sleeve 26 is not allowed to axially move relative to the inner case 23 although it is rotatable. The sleeve 26 is shorter than the inner case 23 and has an expanded distal end such that its diameter is larger at the expanded distal end than at the other portion thereof. The sleeve 26 is positioned outside the cylindrical guide 11 when the power source side connector housing 22 has been inserted in the vehicle side connector 3. An engagement pin 27 is formed on the inner periphery of a distal end of the sleeve 2 so as to project inward. The engagement pin 27 is insertable into either spiral groove 14 of the guide 11. The engagement pin 27 and the spiral grooves 14 thus constitute an engagement mechanism 40 in association with each other. When the sleeve 26 is rotated with the engagement pin 27 received within with either groove 14, the pin 27 is moved along the groove 14 such that the sleeve 26 and accordingly, the whole power source side connector 6 are axially moved. The power source side connector housing 22 is completely mated with the vehicle side connector 3 when the sleeve 26 is full rotated in a clockwise direction, for example, such that the engagement pin 27 is moved nearly to the termination of the spiral groove 14. This state of the engagement mechanism 40 is referred to as a first state. In the first state, when the sleeve 26 is rotated in a counter-clockwise direction, the pin 27 is guided by the groove 14 out of the open end thereof. This state of the engagement mechanism 40 is referred to as a second state. The sleeve 26 has an operation knob 29 projecting therefrom by which the sleeve 26 can be rotated easily.

Locking device 30 is provided in the vicinity of the power source side connector housing 22 of the grip 21 in the power source side connector 6. The locking device 30 is of a well known cylinder type and operated or turned between a locking state and an unlocking state with an ignition key 31 of the electric vehicle for which the power source side connector 6 is used. The locking device 30 has a key hole 30a formed in a side of the grip 21, as shown in FIG. 1. An arm 30b of the locking device 30 is in the position as shown by the solid line in FIG. 2 when the locking device 30 is in the unlocking state. The arm 30b is rotated to a position shown by the chain line in FIG. 2 when the ignition key 31 is inserted into the key hole 30a and turned to the locking position.

An engagement rod 32 is provided between the locking device 30 and the engagement mechanism 40. The rod 32 is held by a guide 33 disposed in the grip 21 so as to be transversely moved. A distal end of the rod 32 faces a notch 34 formed in the rear end of the sleeve 26. An opposite end of the rod 32 is in contact with the arm 30b of the locking device 30. The notch 34 is formed so as to be opposite the rod 32 when the sleeve 26 is rotated in the clockwise direction so that the engagement mechanism 40 is actuated. The rod 32 and the notch 34 constitute a preventing mechanism 35 preventing rotation of the sleeve 26 and accordingly, disengagement of the engagement mechanism 40 when the locking device 30 is turned to the locking state such that the rod 32 invades the notch 34. The rod 32 has a flange 32a usually urging the rod to the right together with a spring 36 interposed between the same and the guide 33, as viewed in FIG. 2.

The power battery 2 of the electric vehicle is charged with the above-described power source side connector 6 in the following manner. The grip 21 of the power source side connector 6 is grasped with one hand, and the distal end of the power source side connector housing 22 is applied to the guide 11 of the vehicle side connector 3. The operation knob 29 of the sleeve 26 is then grasped with the other hand and the sleeve 26 is rotated in the clockwise direction with the connector slightly pushed forward. The engagement pin 27 of the sleeve 26 invades the spiral groove 14, moving along it. The power source side connector housing 22 then advances into the guide 11 of the vehicle side connector 3 such that the terminals 25 are finally connected to the respective terminals 13. Thus, the engagement mechanism 40 assumes the first or holding state. In this state, the power source side connector housing 22 can be prevented from being disengaged from the vehicle side connector 3 even when an external force is applied to the power source side connector 6.

To start the charging as described above, the ignition key 31 of the electric vehicle is inserted into the key hole 30a of the locking device 30. The ignition key 31 is then turned to the locking position and pulled out of the hole 30a, so that the locking device 30 assumes the locking state. Since the arm 30b is rotated to the position shown by the chain line in FIG. 2, the rod 32 of the preventing mechanism 35 is pushed by the arm 30b, thereby being moved to the left against the spring 36. The distal end of the rod 32 then invades the notch 34 of the sleeve 26. Consequently, the sleeve 26 is prevented from being rotated and accordingly, the engagement mechanism 40 cannot be released from the holding state. The power source side connector 6 is thus prevented from being unmated from the vehicle side connector 3.

According to the above-described embodiment, the locking device 30 is turned to the locking state when the connectors 6, 3 are mated together so that charging is initiated. The power source side connector 6 cannot be unmated from the vehicle side connector 3 unless the locking device 30 is turned to the unlocking state. Consequently, in the case where the locking device 30 is actuated after initiation of charging, the connector 6 can be reliably prevented from being disconnected from the vehicle side connector 3 by the invader without permission, for example, even when the connector 6 is left in mating engagement without attendant.

Furthermore, the locking device 30 of the connector 6 can be turned between the locking and unlocking states with the ignition key 31 of the electric vehicle for which charging is performed. Consequently, a key for exclusive use with the connector assembly is not necessary.

Figure 4:
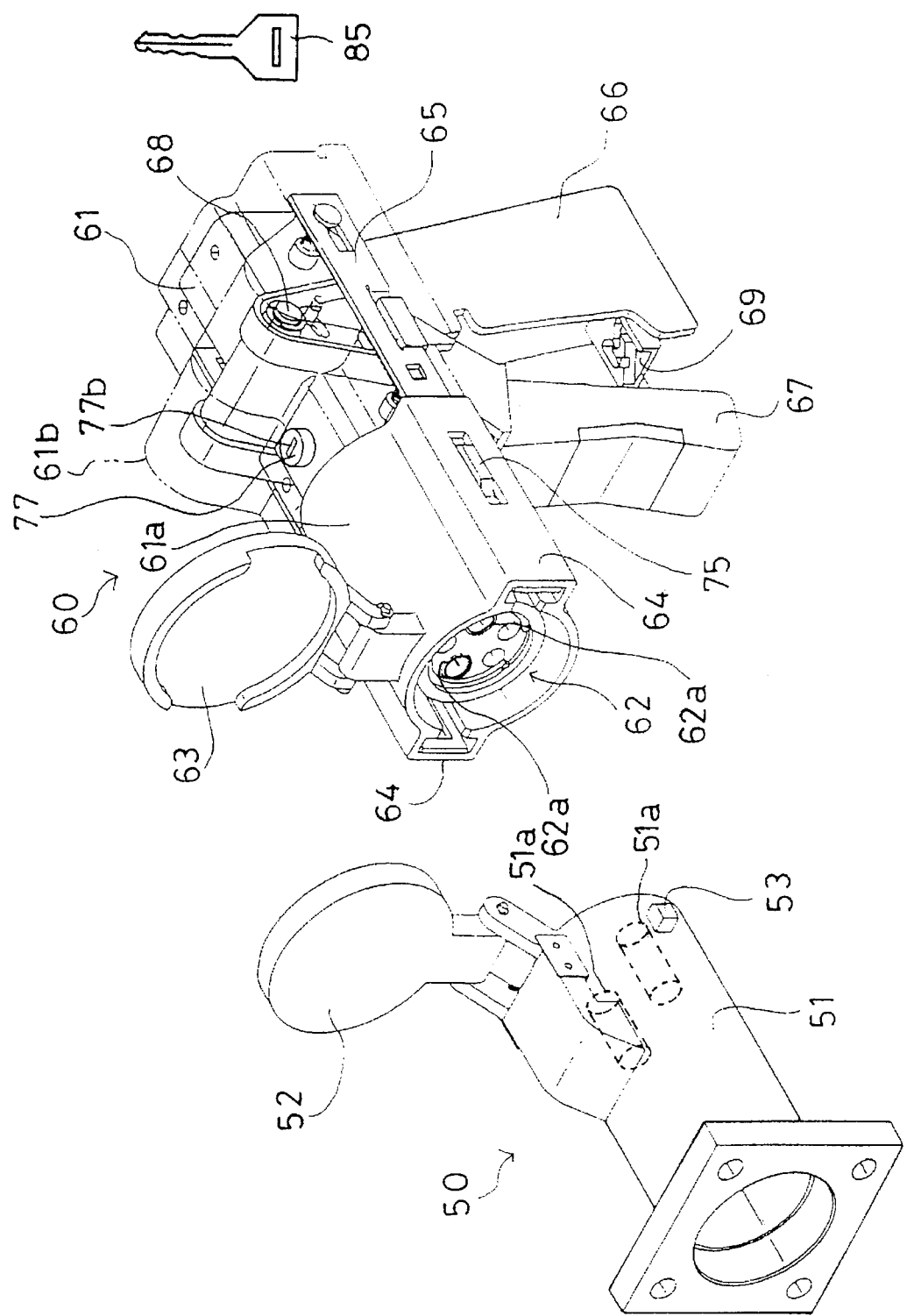
FIG. 4 is a perspective view of a vehicle side connector and a power source side connector of a second embodiment of an electric connector assembly in accordance with the present invention.

A second embodiment of the invention will be described with reference to FIGS. 4 to 7. Referring to FIG. 4, a vehicle side connector 50 to be mounted on the body of the electric vehicle includes a cylindrical connector housing 51 enclosing a plurality of vehicle side terminals 51a. The terminals 51a are to be connected to the power battery of the electric vehicle for the purpose of charging it. A lid 52 is mounted to close and open a front opening of the housing 51. A pair of protrusions 53 one of which is shown in FIG. 4 are formed on the outer periphery of the housing 51. The protrusions 53 are engaged with the power source side connector 60 to assist the connecting operation thereof to the vehicle side connector 50, as will be described later.

The power source side connector 60 is formed into the shape of a gun so that the connection thereof to the vehicle side connector 50 is rendered easy. The connector 60 includes a body 61 and a cylindrical housing 62 provided on the distal end of the body 61. The housing 62 encloses a plurality of power source side terminals 62a corresponding to the respective vehicle side terminals 51a. A front cover 61a is mounted on the body 61 so as to cover the power source side connector housing 62. The front cover 61a also has a lid 63 substantially the same as that of the vehicle side connector housing 50. A predetermined space is retained between the front cover 61a and the power source side connector housing 62 so that the distal end of the vehicle side connector housing 50 can be fitted into the space. The front cover 61a has expanded portions 64 formed on the right-hand and left-hand sides thereof, respectively. Each expanded portion 64 extends in the lengthwise direction of the front cover 61a and has a generally C-shaped section so as to defines spaces therein contiguous to the interior of the front cover 61a. Distal ends of stays 65 are withdrawably inserted in the expanded portions 64, respectively.

The body 61 of the power source side connector 60 includes a grip 66 formed on the rear thereof and a lever 67 disposed in front of the grip 66. The lever 67 is rockably mounted on a support pin 68 mounted on the rear of the body 61. A torsion coil spring (not shown) is wound around the support pin 68 so that the lever 67 is urged so as to be returned to its return position where it extends at a predetermined angle relative to the grip 66.

The grip 66 has a heart-shaped cam groove 69 formed in a bottom plate thereof, as shown in FIG. 4. The lever 67 includes a lock pin (not shown) formed on the inside thereof so as to correspond to the cam groove 69. The lock pin is insertable within the cam groove 69 and is usually urged downward. When the lever 67 assuming the return position is grasped, the lock pin advances onto an inclined bottom of one of two curved portions of the heart-shaped cam groove 69. Upon arrival at a termination of the curved portion, the lock pin falls into a hole formed at the head function of both curved portions, whereby the lever 67 is locked at a grip position. In this condition, when the lever 67 is drawn again, the lock pin is pulled out of the hole, advancing along the bottom of the other curved portion of the cam groove 69. The torsion coil spring causes the lever 67 to return to the return position.

Figure 5:
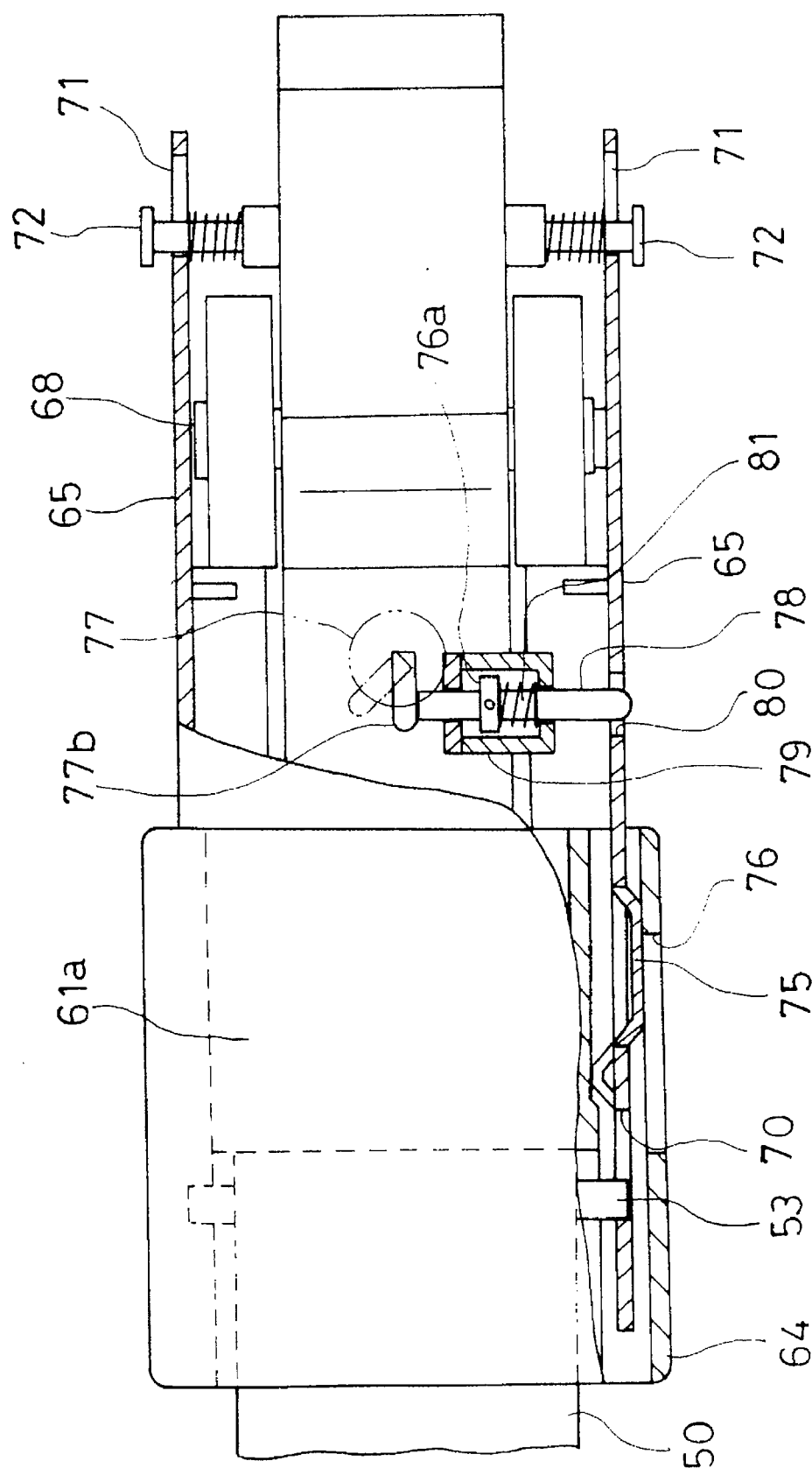
FIG. 5 is a transverse view, partly in section, of the power source side connector.
Figure 6:
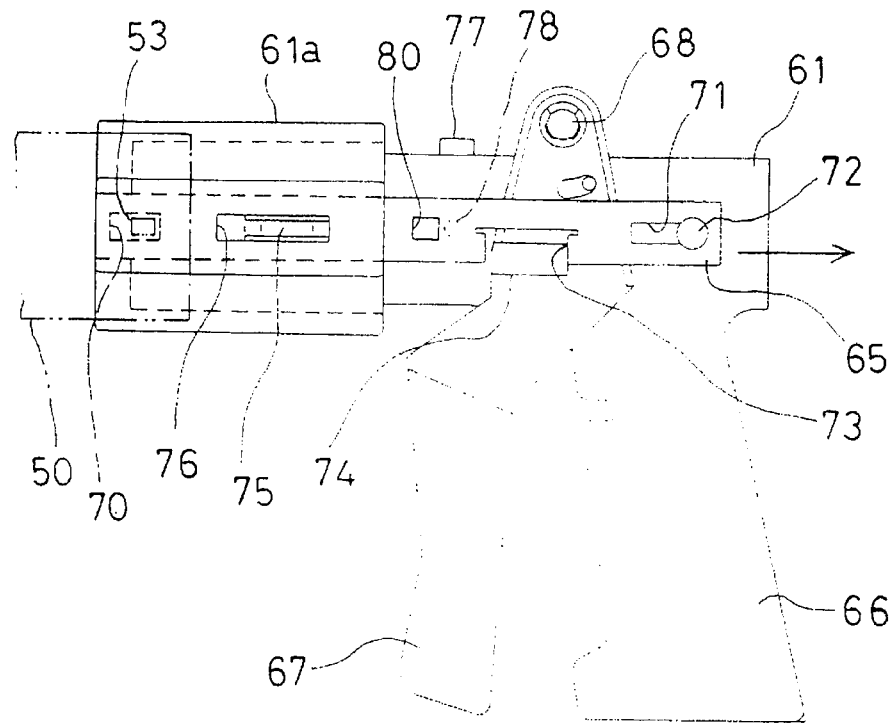
FIG. 6 is a side view of the power source side connector with a cover being partially removed.
Figure 7:
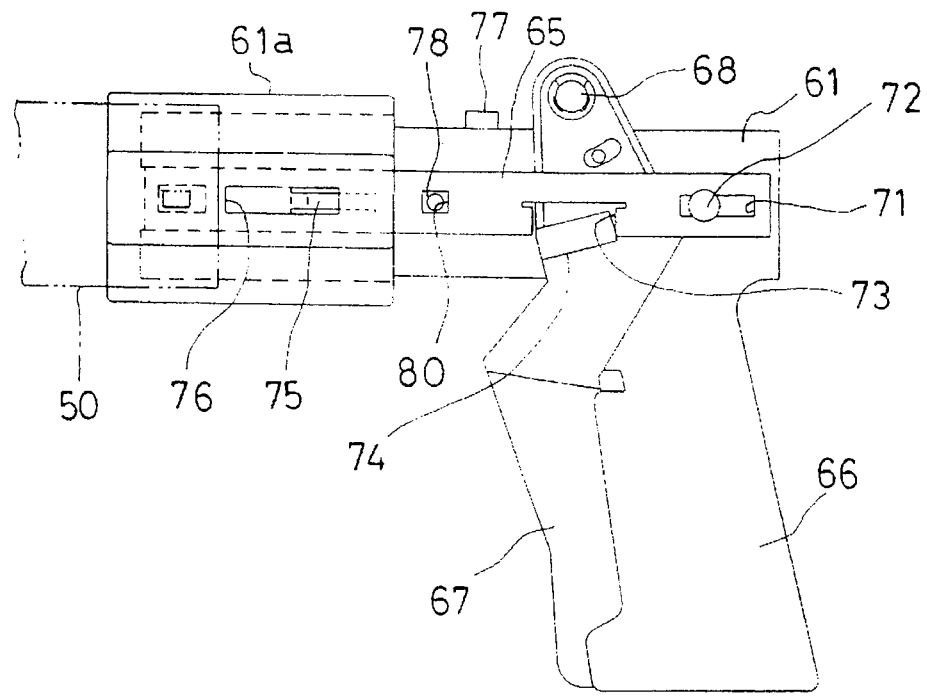
FIG. 7 is also a side view of the power source side connector in a different state from that shown in FIG. 5.

Referring to FIG. 5, the distal ends of both stays 65 are inserted in the respective expanded portions 64. Each stay 65 has a hole 70 in the distal end thereof and another hole 71 in the rear end thereof. The protrusions 53 of the vehicle side connector housing 50 are received in the respective holes 70. Headed pins 72 each projecting from the body 61 are received in the respective holes 71. Furthermore, each stay 65 has a notch 73 formed in the middle portion thereof, as shown in FIGS. 6 and 7. Convex portions 74 of the lever 67 are fitted in the respective notches 73. Consequently, the convex portions 74 are angularly displaced when the lever 67 is grasped, so that the stays 65 are moved backward in the direction of the arrow in FIG. 6. Furthermore, each stay 65 has a trapezoidal projection 75 formed to the rear of the hole 70. The projections 75 are inserted into holes 76 formed in the front cover 61a, respectively. Accordingly, when the lever 67 is grasped such that the stays 65 are moved backward, the projections 75 are pushed by the edges defining the holes 76, respectively, such that the stays 65 are moved away from the inside of the front cover 61a to the side of the power source side connector housing 62. See FIG. 5. A back cover 61b contiguous to the front cover 61a is mounted on the rear half of the upper face of the body 61, as shown in FIG. 4.

The cylinder type of locking device 77 is mounted in the central portion of the upper face of the body 61. The locking device 77 is turned between the locking state and the unlocking state with the ignition key 85 of the electric vehicle for which the power source side connector 60 is used. The locking device 77 has the key hole 77a formed in the upper face of the body 61, as shown in FIG. 4. The arm 77b of the locking device 77 assumes the position shown by the solid line in FIG. 5 when the locking device 77 is in the unlocking state. The arm 77a is rotated to a position shown by the chain line in FIG. 5 when the ignition key 85 is inserted into the key hole 77a and turned to the locking state.

An engagement rod 78 is held on a guide 79 in the upper interior of the body 61 so as to be moved in a direction perpendicular to the stay 65. A distal end of the rod 78 faces an engagement hole 80 formed in the middle of one of the stays 65. The opposite end of the rod 78 is in contact with the arm 77b of the locking device 77. The hole 80 is formed so as to be opposite the rod 78 when the lever 67 is grasped so that the stays 65 are fully drawn back. The rod 78 and the hole 80 constitute a preventing mechanism preventing movement of the stays 65 and accordingly, release of the power source side connector housing 62 from the locked state when the distal end of the rod 78 invades the hole 80. The rod 78 has flange 76a usually urging the rod toward the stay 65 together with a spring 81 interposed between the same and the guide 79.

The operation of the connector assembly will be described. Both lids 52, 63 are opened and then, the grip 66 of the power source side connector 60 is held without squeezing the lever 67. The power source side connector housing 62 is applied to the housing 51 of the vehicle side connector 50, by being pushed towards the connector. The lever 67 is then grasped such that the convex portions 74 are angularly displaced. Consequently, the stays 65 assuming the position shown in FIG. 6 are moved backward toward the position shown in FIG. 7 in the direction of arrow. Thus, the stays 65 are displaced away from the inside of the front cover 61a to the side of the power source side connector housing 62, such that the protrusions 53 of the vehicle side connector housing 51 are received in the respective holes 70 of the stays 65. When the lever 67 is further grasped, both stays 65 are drawn backward. Since the drawing force acts on the vehicle side connector housing 51, its reaction force pushes the power source side connector 60 toward the vehicle side connector 50, so that both connectors 50, 60 are completely mated together. In this condition, the lever 67 is held at the grip position by the cam groove 69 and the power source side connector housing 62 is held in mating engagement with the vehicle side connector housing 51.

To start charging as described above, the ignition key 85 of the electric vehicle is inserted into the key hole 77a of the locking device 77. The ignition key 85 is then turned to the locking position and pulled out of the hole 77a, so that the locking device 77 assumes the locking state. Since the arm 77b is rotated to the position shown by the chain line in FIG. 5, the rod 78 of the preventing mechanism is pushed by the arm 77b, thereby being moved forward against the spring 36. The distal end of the rod 78 then invades the hole 80 of the stay 65. Consequently, the stays 65 are prevented from being moved and accordingly, the lock releasing operation cannot be performed. The power source side connector 60 is thus prevented from being unmated from the vehicle side connector 50.

According to the above-described embodiment, the locking device 77 is turned to the locking state when the connectors 50, 60 are mated together so that charging is initiated. The power source side connector 60 cannot be unmated from the vehicle side connector 50 unless the locking device 77 is turned to the unlocking state. Consequently, the same effect can be achieved in the second embodiment as in the first embodiment. Furthermore, the locking device 77 of the connector 60 can be turned between the locking and unlocking states with the ignition key 85 of the electric vehicle for which charging is performed. Consequently, a key exclusive for use with the connector assembly is not necessary.

Figure 8:
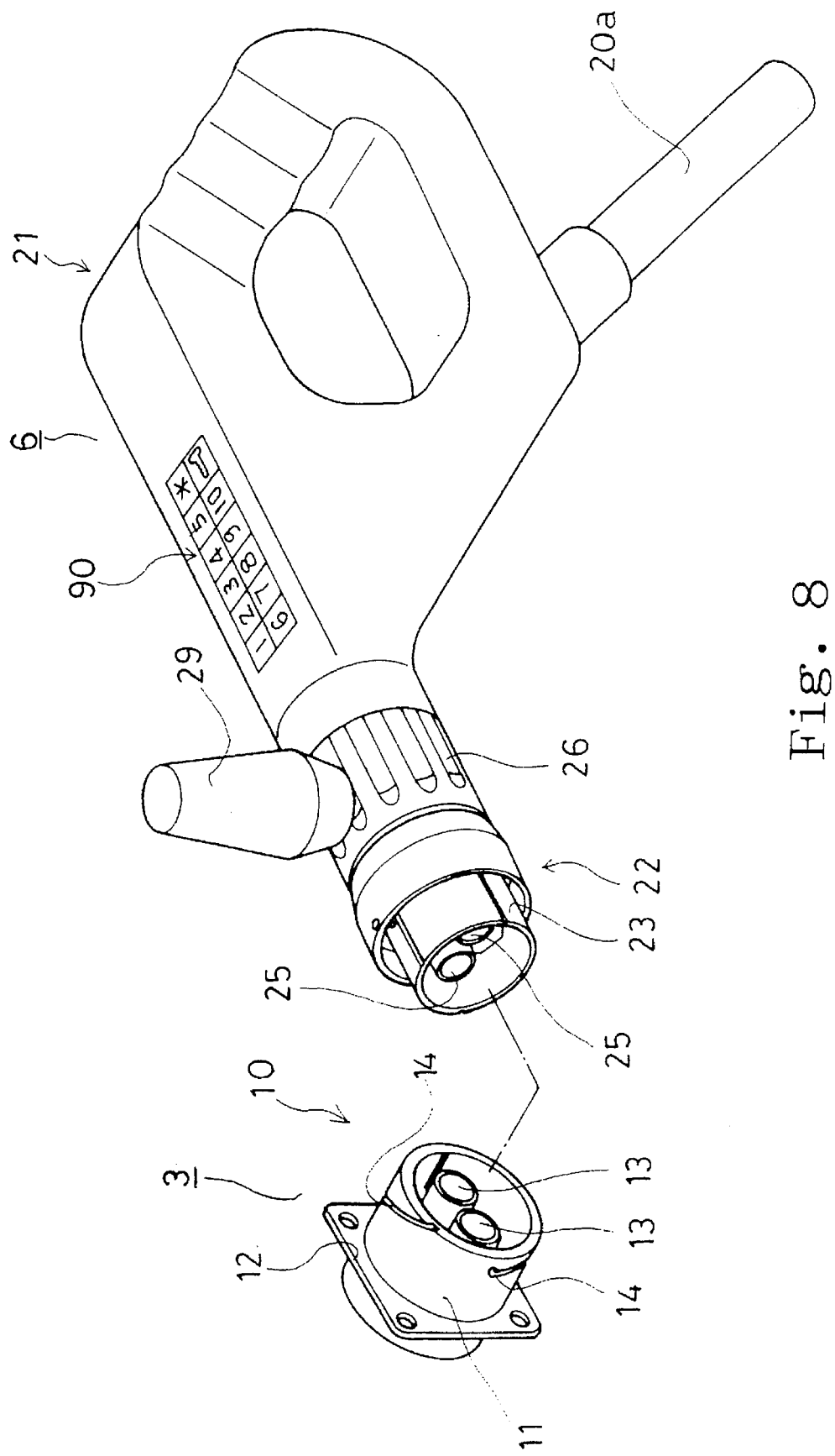
FIG. 8 is a perspective view of a vehicle side connector and a power source side connector of a third embodiment of an electric connector assembly in accordance with the present invention.
Figure 9:
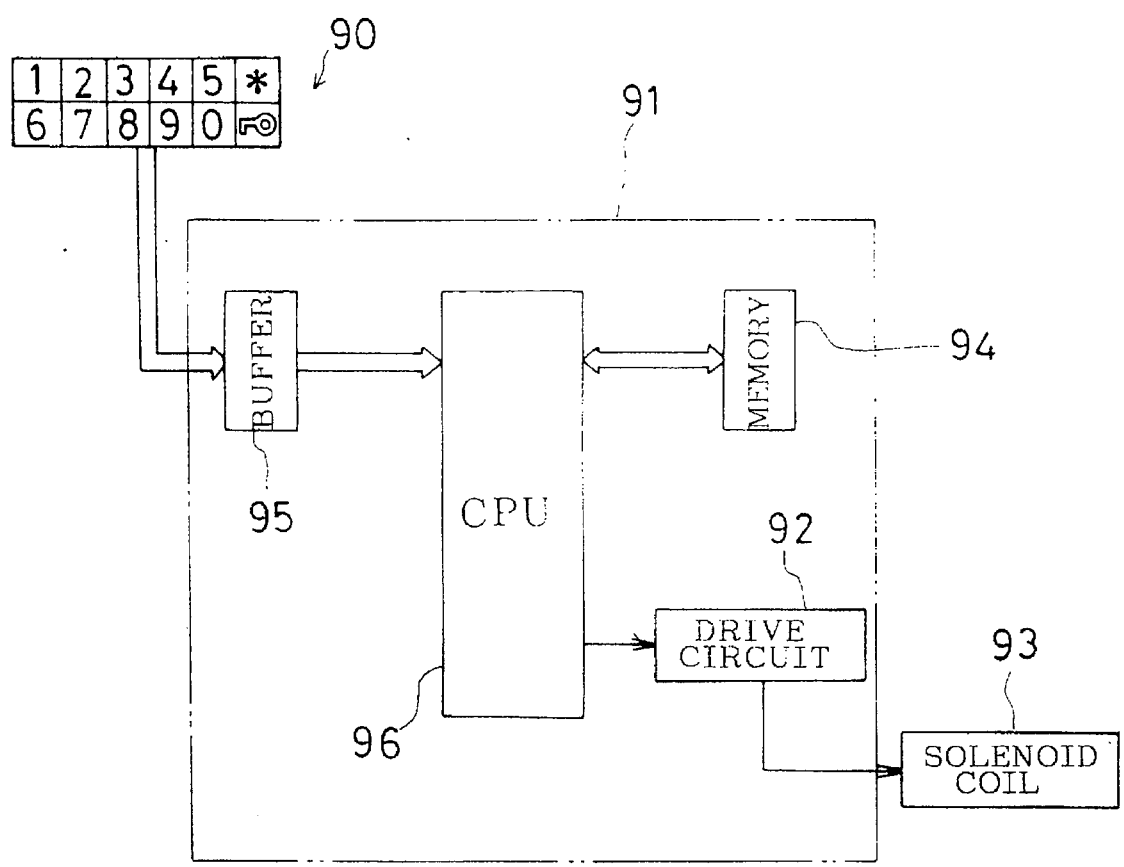
FIG. 9 is a block diagram of an electric circuit of an electronic locking device.

FIGS. 8 and 9 illustrate a third embodiment of the invention. In the third embodiment, the connector assembly is provided with an electronic locking device switchable between the locking state and the unlocking state by inputting an identification code. The other structure of the third embodiment is the same as that of the first embodiment.

The power source side connector 6 includes a ten-key type of code input section 90 provided in the top face of the grip 21. The code input section 90 has a numeric input portion for input of numerals 0 to 9 and a locking and unlocking input portion. An electronic lock circuit 91 and a solenoid coil 93 serving as an actuator are provided in the grip 21. The electronic lock circuit 91 is operated on the basis of a signal from the code input section 90, as shown in FIG. 9. The solenoid coil 93 is operated in response to a drive signal from the electronic lock circuit 91. The solenoid coil 93 includes a rod (not shown) corresponding to the engagement rod 32 of the first embodiment. When the solenoid coil 93 is supplied with a locking signal from the electronic lock circuit 91, the rod thereof invades the notch 34 of the sleeve 26. The rod of the solenoid coil 93 thus forms as the preventing mechanism preventing rotation of the sleeve 26. When the solenoid coil 93 is supplied with an unlocking signal from the electronic lock circuit 91, the rod is withdrawn so that the sleeve 26 is allowed to rotate.

The electronic lock circuit 91 has a function of delivering the locking and unlocking signals to the solenoid coil 93 via a drive circuit 92. The electronic lock circuit 91 includes an identification number storing memory 94 for storing data of an unlocking identification number, a buffer 95 for temporarily storing data of a number input thereto from the code input section 90, and a central processing unit (CPU) 96 serving as a decoding section for comparing the data stored in the memory 94 with the data stored in the buffer 95. CPU 96 delivers the locking signal to the solenoid coil 93 when the locking operation is performed in the code input section 90. When the identification number is input to the code input section 90, CPU 96 compares the data of the input identification number with the data stored in the memory 94. CPU 96 delivers the unlocking signal to the drive circuit 92 when the data of the input identification number coincides with the data stored in the memory 94.

The power battery 2 of the electric vehicle is charged with the above-described power source side connector 6 in the following manner. The power source side connector housing 22 is connected to the vehicle side connector 3 in the same manner as in the first embodiment, and then, the sleeve 26 is rotated to provide the engaging state wherein both connectors are held in mating engagement. Subsequently, a number of four digits is input to the code input section 90, for example, and then, the locking key is operated. The data of the identification number input to the code input section 90 is temporarily stored in the buffer 95 and is written into the memory 94 by CPU 96. Furthermore, the locking signal is delivered from CPU 96 to the drive circuit 92. Consequently, the solenoid coil 93 is operated so that its rod invades the notch 34 of the sleeve 26 to prevent rotation thereof (locking state). Since the sleeve 26 is prevented from rotating while the connector 6 is in the locking state, the power source side connector 6 cannot be disconnected from the vehicle side connector 3. Accordingly, the connector 6 can be reliably prevented from being disconnected from the vehicle side connector 3 by the invader without permission, for example, even when the connector 6 is left in the mating engagement without an attendant.

Subsequently, when the power source side connector 6 is to be disconnected from the vehicle side connector 3 upon the completion of charging, the same identification number that was input for the locking operation is input to the code input section 90 of the connector 6. The data of the input number is written into the buffer 95. CPU 96 determines whether the data of the identification number stored in the buffer 95 coincide with the data stored in the memory 94. CPU 96 delivers the unlocking signal via the drive circuit 92 to the solenoid coil 93 when the data stored in the buffer 95 coincide with that stored in the memory 94. The rod of the solenoid coil 93 is withdrawn from the notch 34 so that the sleeve 26 is allowed to be rotated (unlocking state). Accordingly, the power source side connector 6 can be disconnected from the vehicle side connector 3. On the other hand, when the number input to the code input section 90 does not coincide with that stored in the memory 94, the unlocking signal is not supplied to the solenoid coil 93, so that the sleeve 26 is not turned to the unlocking state.

According to the third embodiment, the sleeve 26 is locked by the electronic locking device upon the starting of charging. The connector 6 can be reliably prevented from being disconnected from the vehicle side connector 3 by the invader without permission, for example, even when the connector 6 is left in the mating engagement without an attendant.

In the above-described embodiment, the same identification number that was input for the locking operation must be input before the sleeve 26 can be turned to the unlocking state. Alternatively, the sleeve may be turned to the unlocking state when the input number coincides with a predetermined number whose data is previously stored in the memory 94. In this arrangement, the identification number can be used both for the connector and for the electric vehicle when the starting locking device of the electric vehicle is of the electronic lock type.

Figure 10:
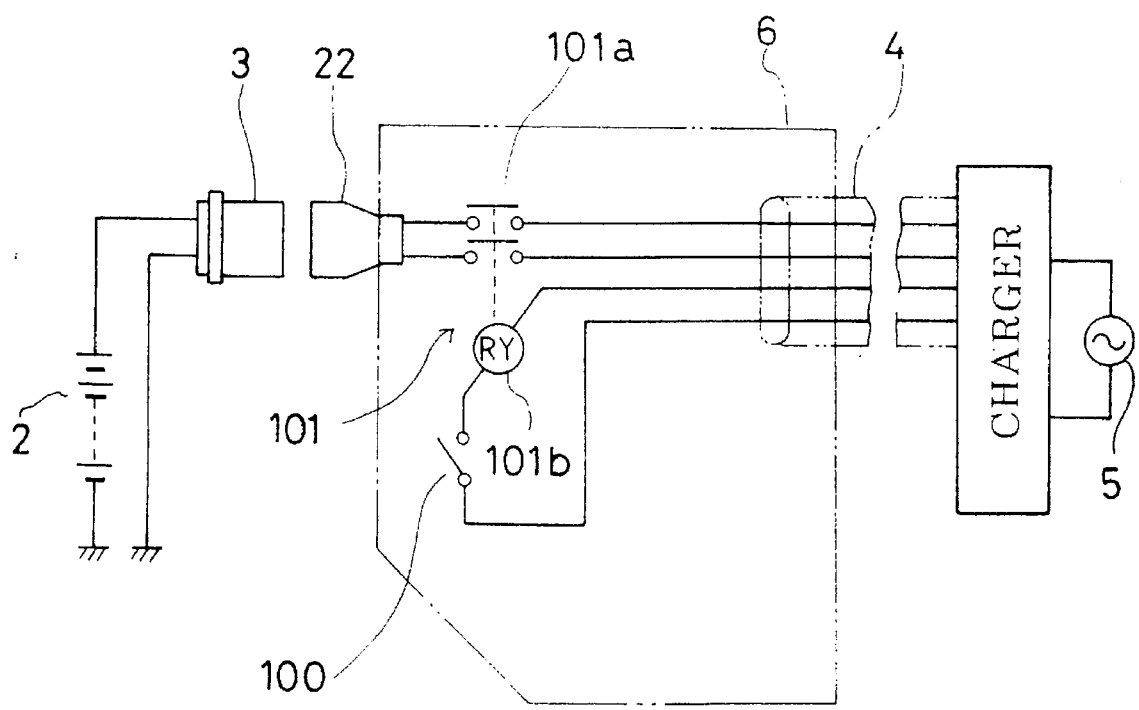
FIG. 10 is a circuit diagram of a fourth embodiment of an electric connector assembly in accordance with the present invention.

FIG. 10 illustrates a fourth embodiment of the invention. The vehicle side and power source side connectors 3, 6 in the fourth embodiment have the same mechanical structure as those in the first embodiment. However, whereas the preventing mechanism 35 operated by the locking device 30 is provided in the first embodiment, in the fourth embodiment, a key switch 100 operated by the locking device 30 is provided instead. Furthermore, a relay 101 serving as a protecting switch is provided in a portion of a charging power circuit between the external power source 5 and the power battery 2 of the electric vehicle, which portion is located in the power source side connector 6. More specifically, a relay switch 101a of the relay 101 is provided in each of positive and negative side circuits of a charging DC power circuit. The relay switch 101a is closed upon energization of a relay coil 101b and is opened upon deenergization of the same. The above-mentioned key switch 100 is closed when the locking device 30 is turned to the unlocking state and is opened when the same is turned to the locking state. The key switch 100 and the relay coil 101b connected in series are connected via the charging cable 4 to the external power source 5.

The power battery 2 of the electric vehicle is charged with the above-described power source side connector 6 in the following manner. First, the power source side connector 6 is connected to the vehicle side connector 3 in the same manner as in the first embodiment. Since the relay switch 101a of the connector 6 is opened in this condition. charging is not initiated. The ignition key 31 of the electric vehicle is inserted into the key hole 30a of the locking device 30 of the connector body 21, being then turned in the unlocking direction. Since the locking device 30 is turned to the unlocking state so that the key switch 100 is closed, the relay coil 101b is energized and accordingly, the relay switch 101a provided in the charging power circuit is closed, whereby the charging of the power battery 2 is initiated. Thereafter, the key switch 100 is held in the closed state when the ignition key 30 is pulled out of the key hole 30a of the locking device 30. Consequently, since the relay switch 101a is also held in the closed state, charging is continued.

Upon completion of charging, the ignition key 31 is inserted into the key hole 30a and then turned in the locking direction so that the relay switch 101a is opened. Then, the sleeve 26 is rotated in the opposite direction, whereby the power source side connector 6 is disconnected from the vehicle side connector 3.

According to the fourth embodiment, charging is allowed to be performed only when the locking device 30 is turned to the unlocking state. In the locking state, the relay switch 101a is held in the open state so that charging is prevented. Accordingly, the charging device can be prevented from being used without permission by a person not possessing the ignition key 31.

Figure 11:
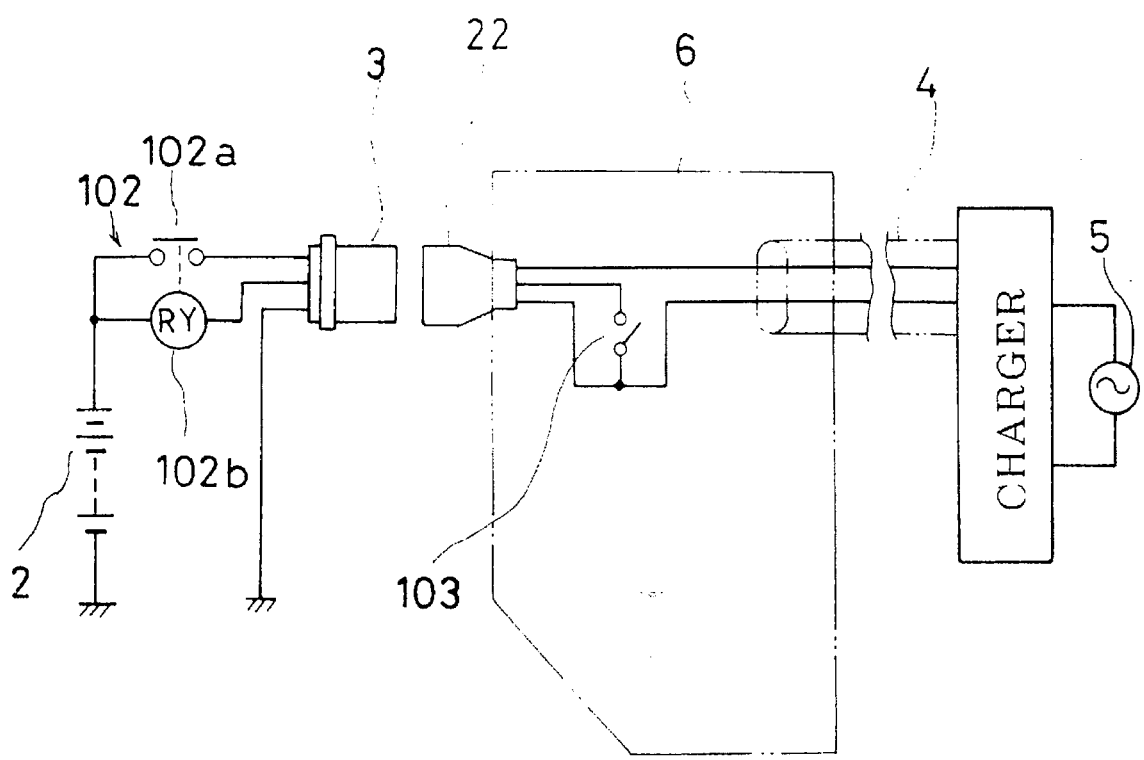
FIG. 11 is a circuit diagram of a fifth embodiment of an electric connector assembly in accordance with the present invention.

The relay 101 is provided in the portion of the charging power circuit located in the connector 6 in the fourth embodiment. However, it may be provided in a portion of the charging power circuit located in the body of the electric vehicle, as shown as a fifth embodiment in FIG. 11. Since the key switch 103 is disposed in the connector 6 in this case, terminals are provided between the vehicle side connector 3 and the housing 22 of the power source side connector 6 for connecting the key switch 103 and the relay coil 102b.

Furthermore, the relay may be provided at the external power source side. Additionally, the AC power source circuit connected to the external power source may be opened and closed by a switching element such as a relay or a thyristor. When the key switch operated by the locking device is allowed to have a sufficient current capacity, the key switch may be used as the protecting switch so that the charging power circuit is opened and closed directly by the key switch without use of the switching element such as the relay.

In the foregoing fourth embodiment, the cylinder type of locking device is employed and it is turned between the locking state and the unlocking state by the ignition key of the electric vehicle. Alternatively, an electronic locking device as employed in the third embodiment may be employed in the fourth embodiment.

Regarding the engagement mechanism for engaging the power source side connector with the vehicle side connector, an engagement mechanism employing a solenoid may be provided. Alternatively, an engagement mechanism may be provided for locking the power source side connector to the vehicle side connector by rotation of the whole power source side connector.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. An electric vehicle charging connector assembly for use in externally charging a power battery provided in a body of an electric vehicle, thereby powering the electric vehicle, the connector assembly comprising:

a) a vehicle side connector housing provided on the body of the electric vehicle;

b) vehicle side terminals enclosed in the vehicle side connector housing;

c) a power source side connector housing configured to be mated with and unmated from the vehicle side connector housing;

d) power source side terminals enclosed in the power source side connector housing to be electrically connected to the respective vehicle side terminals when the power source side connector housing is mated with the vehicle side connector housing;

e) engagement means for holding the power source and vehicle side connector housings in a mating engagement when assuming a first state, and for releasing the connector housings from the mating engagement when assuming a second state;

f) preventing means for preventing the engagement means from being changed from the first state to the second state; and g) locking means provided in the power source side connector housing for activating the preventing means, when assuming a locking state, to cause the engagement means to be prevented from being moved from the first state to the second state, and for deactivating the preventing means, when assuming an unlocking state, allow the engagement means to be moved from the first state to the second state.

2. A connector assembly according to claim 1, wherein the locking lock means is a key lock that is switchable between the locking state and the unlocking state with an ignition key of the electric vehicle.

3. A connector assembly according to claim 1, wherein the locking means comprises an electronic lock including a code input section provided on a surface of the power source side connector housing, a memory for storing data of an unlocking code, a decoding section for comparing a code inputted to the code input section with the data of the unlocking code stored in the memory to thereby generate a decoding signal when the inputted code has a predetermined relation with the unlocking code, and an actuator for performing a locking operation and an unlocking operation in response to the decoding signal generated by the decoding section.

4. An electric vehicle charging connector assembly for charging a power battery provided in a body of an electric vehicle from an external power source via a charging power circuit thereby powering the electric vehicle, the connector assembly comprising:

a) a vehicle side connector housing provided on the body of the electric vehicle;

b) vehicle side terminals enclosed in the vehicle side connector housing;

c) a power source side connector housing configured to be mated with and unmated from the vehicle side connector housing;

d) power source side terminals enclosed in the power source side connector housing to be electrically connected to the respective vehicle side terminals when the power source side connector housing is mated with the vehicle side connector housing;

e) a lock provided in the power source side connector housing; and f) a protecting switch provided in the charging power circuit, said switch being operatively connected to said lock so as to close when the lock has been operated under a predetermined condition.

5. A connector assembly according to claim 4, wherein the lock is a key lock that is turnable between the locking state and the unlocking state with an ignition key of the electric vehicle.

6. A connector assembly according to claim 4, wherein the lock is an electronic lock including a code input section provided on a surface of the power source side connector housing, a memory for storing data of an unlocking code, a decoding section for comparing a code inputted to the code input section with the date of the unlocking code stored in the memory to thereby generate a decoding signal when the inputted code has a predetermined relation with the unlocking code, and an actuator for performing a locking operation and an unlocking operation in response to the decoding signal generated by the decoding section.

7. An electric vehicle charging connector assembly for use in externally charging a power battery provided in a body of an electric vehicle, thereby powering the electric vehicle, the connector assembly comprising:

a vehicle side connector housing provided on the body of the electric vehicle;

vehicle side terminals enclosed in the vehicle side connector housing;

a power source side connector housing configured to be mated with and unmated from the vehicle side connector housing;

power source side terminals enclosed in the power source side connector housing to be electrically connected to the respective vehicle side terminals when the power source side connector housing is mated with the vehicle side connector housing;

a lock provided in the power source side connector housing, said lock being switchable between a locking state and an unlocking state;

the power source side connector housing and the vehicle side connector housing having an engagement mechanism that is movable by an operator of the charging connector assembly, while said lock remains in said unlocking state, between a first state in which the engagement mechanism holds said power source and vehicle side connector housings in a mating engagement and a second state in which said power source and vehicle side connector housings are released from being in mating engagement; and a preventing mechanism, operatively connected between said engagement mechanism and said lock, for preventing the engagement mechanism, once having been moved to said first state, from being moved from the first state to said second state when said lock is thereafter switched from said unlocking state to said locking state.

8. A connector assembly according to claim 7, wherein the lock is a key lock that is switchable between the locking state and the unlocking state with an ignition key of the electric vehicle.

9. A connector assembly according to claim 7, wherein the lock is an electronic lock including a code input section provided on a surface of the power source side connector housing, a memory for storing data of an unlocking code, a decoding section for comparing a code inputted to the code input section with the data of the unlocking code stored in the memory to thereby generate a decoding signal when the inputted code has a predetermined relation with the unlocking code, and an actuator for performing a locking operation and an unlocking operation in response to the decoding signal generated by the decoding section.

* * * * *